United States Patent
Zhu et al.

(10) Patent No.: US 12,411,309 B2
(45) Date of Patent: Sep. 9, 2025

(54) CAMERA OPTICAL LENS INCLUDING SIX LENSES OF −++−+− REFRACTIVE POWERS

(71) Applicant: AAC Optics (Suzhou) Co., Ltd., Suzhou (CN)

(72) Inventors: Yongxiang Zhu, Suzhou (CN); Jia Chen, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 378 days.

(21) Appl. No.: 18/307,818

(22) Filed: Apr. 27, 2023

(65) Prior Publication Data
US 2024/0094506 A1   Mar. 21, 2024

(30) Foreign Application Priority Data
Apr. 29, 2022   (CN) .......................... 202210475657.8

(51) Int. Cl.
*G02B 13/00* (2006.01)
*G02B 9/62* (2006.01)

(52) U.S. Cl.
CPC ........... *G02B 9/62* (2013.01); *G02B 13/0045* (2013.01)

(58) Field of Classification Search
CPC .............................. G02B 9/62; G02B 13/0045
See application file for complete search history.

(56) References Cited

U.S. PATENT DOCUMENTS

2022/0107481 A1 *   4/2022   Li ..................... G02B 13/0045

* cited by examiner

*Primary Examiner* — Wen Huang
(74) *Attorney, Agent, or Firm* — Wiersch Law Group (57) ABSTRACT

The present disclosure relates to the technical field of optical lens and discloses a camera optical lens. The camera optical lens includes, from an object side to an image side: a first lens having a negative refractive power; a second lens having a positive refractive power; a third lens having a positive refractive power; a fourth lens having a negative refractive power; a fifth lens having a positive refractive power; and a sixth lens having a negative refractive power. The camera optical lens satisfies following conditions: $-8.00 \leq f1/f \leq -3.00$; $-6.00 \leq f34/f \leq -1.50$; and $R10/R9 \geq 1.50$. The camera optical lens has outstanding optical functions, while satisfying a desire of large aperture and long focal length.

10 Claims, 8 Drawing Sheets

FIG. 16

CAMERA OPTICAL LENS INCLUDING SIX LENSES OF −++−+− REFRACTIVE POWERS

TECHNICAL FIELD

The present disclosure relates to the field of optical lens, in particular, to a camera optical lens suitable for handheld devices, such as smart phones and digital cameras, and imaging devices, such as monitors, PC lenses or vehicle-mounted lenses.

BACKGROUND

With the emergence of various smart devices in recent years, the demand for miniature camera optical lens is increasing day by day, and as the pixel size of the photosensitive devices become smaller, plus the current development trend of electronic products towards better functions and thinner and portable dimensions, miniature camera optical lens with good imaging quality therefore have become a mainstream in the market. In order to obtain better imaging quality, the lens generally adopts a multi-piece lens structure. Also, with the development of technology and the increase of the diverse demands of users, and as the pixel area of photosensitive devices is becoming smaller and smaller and the requirement of the system on the imaging quality is improving constantly, the six-piece lens structure gradually appear in lens designs. There is an urgent need for long-focal-length camera lenses with good optical characteristics, large aperture and fully corrected aberration.

SUMMARY

To address the above issues, the present disclosure seeks to provide a camera optical lens that satisfies a design requirement of large aperture and long focal length while having outstanding optical functions.

In order to address the above issues, embodiments of the present disclosure provide a camera optical lens including, from an object side to an image side: a first lens having a negative refractive power; a second lens having a positive refractive power; a third lens having a positive refractive power; a fourth lens having a negative refractive power; a fifth lens having a positive refractive power; and a sixth lens having a negative refractive power; wherein the camera optical lens satisfies following conditions: $-8.00 \le f1/f \le -3.00$; $-6.00 \le f34/f \le -1.50$; and $R10/R9 \ge 1.50$; where f denotes a focal length of the camera optical lens; f1 denotes a focal length of the first lens; f34 denotes a combined focal length of the third lens and the fourth lens; R9 denotes a central curvature radius of an object-side surface of the fifth lens; and R10 denotes a central curvature radius of an image-side surface of the fifth lens.

As an improvement, the camera optical lens further satisfies the following condition: $2.00 \le R12/R11 \le 30.00$; where R11 denotes a central curvature radius of an object-side surface of the sixth lens; and R12 denotes a central curvature radius of an image-side surface of the sixth lens.

As an improvement, the camera optical lens further satisfies the following condition: $5.00 \le d8/d4 \le 20.00$; where d4 denotes an on-axis distance from an image-side surface of the second lens to an object-side surface of the third lens; and d8 denotes an on-axis distance from an image-side surface of the fourth lens to an object-side surface of the fifth lens.

As an improvement, an object-side surface of the first lens is convex in a paraxial region and an image-side surface of the first lens is concave in the paraxial region; and the camera optical lens further satisfies following conditions: $2.11 \le (R1+R2)/(R1-R2) \le 7.56$; and $0.04 \le d1/TTL \le 0.22$; where R1 denotes a central curvature radius of an object-side surface of the first lens; R2 denotes a central curvature radius of an image-side surface of the first lens; d1 denotes an on-axis thickness of the first lens; and TTL denotes a total optical length from an object-side surface of the first lens to an image surface of the camera optical lens along an optical axis.

As an improvement, an image-side surface of the second lens is convex in the paraxial region; and the camera optical lens further satisfies following conditions: $0.50 \le f2/f \le 1.92$; $-0.88 \le (R3+R4)/(R3-R4) \le 1.68$; and $0.04 \le d3/TTL \le 0.19$; where f2 denotes a focal length of the second lens; R3 denotes a central curvature radius of an object-side surface of the second lens; R4 denotes a central curvature radius of an image-side surface of the second lens; and d3 denotes an on-axis thickness of the second lens; and TTL denotes a total optical length from an object-side surface of the first lens to an image surface of the camera optical lens along an optical axis.

As an improvement, the object-side surface of the third lens is convex in a paraxial region; and the camera optical lens further satisfies following conditions: $0.46 \le f3/f \le 1.66$; $-2.21 \le (R5+R6)/(R5-R6) \le -0.40$; and $0.03 \le d5/TTL \le 0.20$; where f3 denotes a focal length of the third lens; R5 denotes a central curvature radius of an object-side surface of the third lens; R6 denotes a central curvature radius of an image-side surface of the third lens; d5 denotes an on-axis thickness of the third lens; and TTL denotes a total optical length from an object-side surface of the first lens to an image surface of the camera optical lens along an optical axis.

As an improvement, an image-side surface of the fourth lens is concave in the paraxial region; and the camera optical lens further satisfies following conditions: $-1.45 \le f4/f \le -0.35$; $0.32 \le (R7+R8)/(R7-R8) \le 1.59$; and $0.01 \le d7/TTL \le 0.17$; where f4 denotes a focal length of the fourth lens; R7 denotes a central curvature radius of an object-side surface of the fourth lens; R8 denotes a central curvature radius of an image-side surface of the fourth lens; and d7 denotes an on-axis thickness of the fourth lens; and TTL denotes a total optical length from an object-side surface of the first lens to an image surface of the camera optical lens along an optical axis.

As an improvement, an object-side surface of the fifth lens is convex in a paraxial region and an image-side surface of the fifth lens is concave in the paraxial region, and the camera optical lens further satisfies following conditions: $0.59 \le f5/f \le 2.32$; $-9.84 \le (R9+R10)/(R9-R10) \le -0.69$; and $0.03 \le d9/TTL \le 0.15$; where f5 denotes a focal length of the fifth lens; d9 denotes an on-axis thickness of the fifth lens; and TTL denotes a total optical length from an object-side surface of the first lens to an image surface of the camera optical lens along an optical axis.

As an improvement, an object-side surface of the sixth lens is concave in a paraxial region, an image-side surface of the sixth lens is convex in the paraxial region, and the camera optical lens further satisfies following conditions: $-3.82 \le f6/f \le -1.01$; $-5.90 \le (R11+R12)/(R11-R12) \le -0.71$; and $0.02 \le d11/TTL \le 0.22$; where f6 denotes a focal length of the sixth lens; R11 denotes a central curvature radius of an object-side surface of the sixth lens; R12 denotes a central curvature radius of an image-side surface of the sixth lens; d11 denotes an on-axis thickness of the sixth lens; and TTL denotes a total optical length from an object-side surface of the first lens to an image surface of the camera optical lens along an optical axis.

As an improvement, at least one of the first lens, the second lens, the third lens, the fourth lens, the fifth lens and the sixth lens is glass.

The present disclosure is advantageous in: the camera optical lens according to the present disclosure has good optical characteristics, has characteristics of large aperture and long focal length, and is especially fit for a mobile phone camera optical lens component and a WEB camera lens composed by such camera elements as a charge coupled device (CCD) and a complementary metal oxide semiconductor (CMOS) for high pixels.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
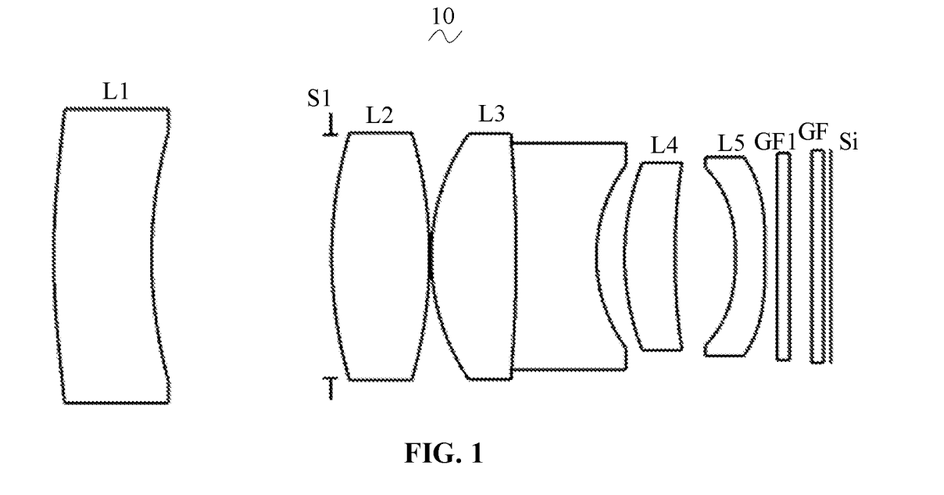
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, and the camera optical lens 10 includes six lenses. Specifically, the camera optical lens 10 includes, from an object side to an image side: a first lens L1, an aperture S1, a second lens L2, a third lens L3, a fourth lens L4, a fifth lens L5 and a sixth lens L6. An optical element such as an optical filter GF can be arranged between the sixth lens L6 and an image surface Si. In this embodiment, two optical filters are included: GF1 and GF2.

In an embodiment, both an object-side surface and an image-side surface of the first lens L1 are aspheric surfaces. Both an object-side surface and an image-side surface of the sixth lens L6 are aspheric surfaces. Surfaces of the rest lenses are spherical surfaces. By designing some lenses as spherical-surface lenses, difficulty in manufacturing of the lenses may be reduced.

At least one of the first lens L1, the second lens L2, the third lens L3, the fourth lens L4, the fifth lens L5 and the sixth lens L6 is glass. In an embodiment, all of the first lens L1, the second lens L2, the third lens L3, the fourth lens L4, the fifth lens L5 and the sixth lens L6 are glass. Glass lenses facilitate improving performance and stability of the camera optical lens 10. In an alternative embodiment, the lenses may be other materials.

In an embodiment, a focal length of the camera optical lens 10 is defined as f, a focal length of the first lens L1 is defined as f1, and the camera optical lens 10 satisfies a condition of $-8.00 \leq f1/f \leq -3.00$, which specifies a ratio of the focal length f1 of the first lens L1 and the focal length f of the camera optical lens 10. This range may facilitate effectively balancing a field curvature of the camera optical lens 10, so that a field curvature offset of a central field is less than 20 μm.

In an embodiment, a combined focal length of the third lens L3 and the fourth lens L4 is defined as f34, and the camera optical lens 10 satisfies a condition of $-6.00 \leq f34/f \leq -1.50$, which specifies a ratio of the combined focal length f34 of the third lens L3 and the fourth lens L4 and the focal length f of the camera optical lens 10. This range may reduce sensitivity of the camera optical lens 10 through a reasonable distribution of focal lengths.

In an embodiment, a central curvature radius of an object-side surface of the fifth lens L5 is defined as R9, a central curvature radius of an image-side surface of the fifth lens L5 is defined as R10, and the camera optical lens 10 further satisfies a condition of $R10/R9 \geq 1.50$, which specifies a shape of the fifth lens L5. The range facilitates correcting astigmatism and distortion of the camera optical lens 10, so that the distortion satisfies a condition of $|Distortion| \leq 3.0\%$ and possibility of generation of vignetting is reduced.

In an embodiment, a central curvature radius of an object-side surface of the sixth lens L6 is defined as R11, and a central curvature radius of an image-side surface of the sixth lens L6 is defined as R12, and the camera optical lens 10 satisfies a condition of 2.00≤R12/R11≤30.00, which specifies a shape of the sixth lens L6. The range reduces deflection of light, and may effectively correct chromatic aberration so that the chromatic aberration is satisfies a condition of |LC|≤3.5 μm.

In an embodiment, an on-axis distance from an image-side surface of the second lens L2 to an object-side surface of the third lens L3 is defined as d4, an on-axis distance from an image-side surface of the fourth lens L4 to the object-side surface of the fifth lens L5 is defined as d8, and the camera optical lens 10 satisfies a condition of 10.00≤d2/d4≤50.00, which specifies a ratio of a space between the fourth lens L1 and the fifth lens L5 and a space between the second lens L2 and the third lens L3. This range facilitates shortening a total optical length of the camera optical lens 10 so as to achieve ultra-thinness.

In an embodiment, the object-side surface of the first lens L1 is convex in a paraxial region, and an image-side surface of the first lens L1 is concave in the paraxial region. The first lens L1 has a negative refractive power. In an alternative embodiment, the object-side surface and the image-side surface of the first lens L1 may be set as other distribution conditions of concave and convex surfaces.

A central curvature radius of the object-side surface of the first lens L1 is defined as R1, a central curvature radius of the image-side surface of the first lens L1 is defined as R2, and the camera optical lens 10 satisfies a condition of 2.11≤(R1+R2)/(R1−R2)≤7.56. By reasonably controlling a shape of the first lens L1, the first lens L1 may effectively correct spherical aberration of the system. Preferably, the camera optical lens 10 satisfies a condition of 3.38≤(R1+R2)/(R1−R2)≤6.05.

An on-axis thickness of the first lens L1 is defined as d1, a total optical length of the camera optical lens 10 from the object-side surface of the first lens L1 to an image surface of the camera optical lens 10 along an optical axis is defined as TTL, and the camera optical lens 10 satisfies a condition of 0.04≤d1/TTL≤0.22. Within the range, miniaturization may be achieved. Preferably, the camera optical lens 10 satisfies a condition of 0.07≤d1/TTL≤0.17.

In an embodiment, an object-side surface of the second lens L2 is convex in the paraxial region, an image-side surface of the second lens L2 is convex in the paraxial region, and the second lens L2 has a positive refractive power. In an alternative embodiment, the object-side surface and image-side surface of the second lens L2 may be set as other distribution conditions of concave and convex surfaces.

The focal length of the second lens L2 is defined as f2, and the camera optical lens 10 further satisfies a condition of 0.50≤f2/f≤1.92. By controlling a refractive power of the second lens L2 within a reasonable range, correction of the aberration of the optical system may be achieved. Preferably, the camera optical lens 10 further satisfies a condition of 0.81≤f2/f≤1.53.

A central curvature radius of the object-side surface of the second lens L2 is defined as R3, a central curvature radius of an image-side surface of the second lens L2 is defined as R4, and the camera optical lens 10 further satisfies a condition of −0.88≤(R3+R4)/(R3−R4)≤1.68, which specifies a shape of the second lens L2. Within this range, a development towards ultra-thin and wide-angle lenses would facilitate correcting a problem of off-axis aberration. Preferably, the camera optical lens 10 further satisfies a condition of −0.55≤(R3+R4)/(R3−R4)≤1.35.

An on-axis thickness of the second lens L2 is defines as d3, and the camera optical lens 10 further satisfies a condition of 0.04≤d3/TTL≤0.19. This can facilitate achieving miniaturization. Preferably, the camera optical lens 10 further satisfies a condition of 0.07≤d3/TTL≤0.15.

In an embodiment, an object-side surface of the third lens L3 is convex in the paraxial region, an image-side surface of the third lens L3 is convex in the paraxial region, and the third lens L3 has a positive refractive power. In an alternative embodiment, the object-side surface and image-side surface of the third lens L3 may be set as other distribution conditions of concave and convex surfaces.

A focal length of the third lens L3 is defined as f3, and the camera optical lens 10 further satisfies a condition of 0.46≤f3/f≤1.66. An appropriate distribution of the refractive power leads to a better imaging quality and a lower sensitivity of the camera optical lens 10. Preferably, the camera optical lens 10 further satisfies a condition of 0.73≤f3/f≤1.33.

A central curvature radius of the object-side surface of the third lens L3 is defined as R5, a central curvature radius of the image-side surface of the third lens L3 is defined as R6, and the camera optical lens 10 further satisfies a condition of −2.21≤(R5+R6)/(R5−R6)≤−0.40. This can effectively control a shape of the third lens L3. Within this range, a development towards ultra-thin and wide-angle lenses would facilitate correcting the problem of off-axis aberration. Preferably, the camera optical lens 10 further satisfies a condition of −1.38≤(R5+R6)/(R5−R6)≤−0.50.

An on-axis thickness of the third lens L3 is defined as d5, and the camera optical lens 10 further satisfies a condition of 0.03≤d5/TTL≤0.20. This range facilitates achieving miniaturization. Preferably, the camera optical lens 10 further satisfies a condition of 0.05≤d5/TTL≤0.16.

In an embodiment, an object-side surface of the fourth lens L4 is concave in the paraxial region, an image-side surface of the fourth lens L4 is concave in the paraxial region, and the fourth lens L4 has a negative refractive power. In an alternative embodiment, the object-side surface and image-side surface of the fourth lens L4 may be set as other distribution conditions of concave and convex surfaces. The fourth lens L4 may have a negative refractive power.

A focal length of the fourth lens L4 is defined as f4, and the camera optical lens 10 further satisfies a condition of −1.45≤f4/f≤−0.35. The appropriate distribution of refractive power makes the system have better imaging quality and lower sensitivity. Preferably, the camera optical lens 10 further satisfies a condition of −0.91≤f4/f≤−0.44.

A central curvature radius of the object-side surface of the fourth lens L4 is defined as R7, a central curvature radius of the image-side surface of the fourth lens L4 is defined as R8, and the camera optical lens 10 further satisfies a condition of 0.32≤(R7+R8)/(R7−R8)≤1.59, which specifies a shape of the fourth lens L4. With a development towards ultra-thin and long-focal-length lenses, this range facilitates correcting a problem like an off-axis aberration. Preferably, the camera optical lens 10 further satisfies a condition of 0.51≤(R7+R8)/(R7−R8)≤1.27.

An on-axis thickness of the fourth lens L4 is defined as d7, and the camera optical lens 10 further satisfies a condition of 0.01≤d7/TTL≤0.17. This can facilitate achieving miniaturization. Preferably, the camera optical lens 10 further satisfies a condition of 0.02≤d7/TTL≤0.13.

In an embodiment, an object-side surface of the fifth lens L5 is convex in the paraxial region, an image-side surface of the fifth lens L5 is concave in the paraxial region, and the fifth lens L5 has a positive refractive power. In an alternative embodiment, the object-side surface and image-side surface of the fifth lens L5 may be set as other distribution conditions of concave and convex surfaces.

A focal length of the fifth lens L5 is defined as f5, and the camera optical lens 10 further satisfies a condition of 0.59≤f5/f≤2.32. Through reasonable distribution of refractive powers, the system may have better imaging quality and lower sensitivity. Preferably, the camera optical lens 10 further satisfies a condition of 0.95≤f5/f≤1.86.

The fifth lens L5 further satisfies a condition of −9.84≤ (R9+R10)/(R9−R10)≤−0.69, which specifies a shape of the fifth lens L5. Within this range, a development towards ultra-thin and wide-angle lenses facilitates correcting a problem of the off-axis aberration. Preferably, the camera optical lens 10 further satisfies a condition of −6.15≤(R9+ R10)/(R9−R10)≤−0.87.

An on-axis thickness of the fifth lens L5 is defined as d9, and the camera optical lens 10 further satisfies a condition of 0.03≤d9/TTL≤0.15. This range facilitates achieving miniaturization. Preferably, the camera optical lens 10 further satisfies a condition of 0.05≤d9/TTL≤0.12.

In an embodiment, an object-side surface of the sixth lens L6 is concave in the paraxial region, an image-side surface of the sixth lens L6 is convex in the paraxial region, and the sixth lens L6 has a negative refractive power. In an alternative embodiment, the object-side surface and image-side surface of the sixth lens L6 may be set as other distribution conditions of concave and convex surfaces.

A focal length of the sixth lens L6 is defined as f6, and the camera optical lens 10 further satisfies a condition of −3.82≤f6/f≤−1.01. The appropriate distribution of refractive power makes it possible that the system has the better imaging quality and lower sensitivity. Preferably, the camera optical lens 10 further satisfies a condition of −2.39≤f6/f≤− 1.26.

The sixth lens L6 further satisfies a condition of −5.90≤ (R11+R12)/(R11−R12)≤−0.71, which specifies a shape of the sixth lens L6. With a development towards ultra-thin and wide-angle lenses, this range facilitates correcting a problem of off-axis aberration. Preferably, the camera optical lens 10 further satisfies a condition of −3.69≤(R11+R12)/(R11− R12)≤−0.89.

An on-axis thickness of the sixth lens L6 is defined as d11, and the camera optical lens 10 further satisfies a condition of 0.02≤d11/TTL≤0.22. This range facilitates achieving miniaturization. Preferably, the camera optical lens 10 further satisfies a condition of 0.03≤d11/TTL≤0.17.

In an embodiment, an image height of the camera optical lens 10 is IH, an effective focal length of the camera optical lens 10 is EFL, and the camera optical lens 10 satisfies a condition of EFL/IH≥3.20. Therefore, the camera optical lens 10 has a long focal length.

In an embodiment, an F number of the camera optical lens 10 is FNO which is less than or equal to 1.65. Thus, the camera optical lens 10 has a large aperture and a better imaging performance. Preferably, the F number of FNO of the camera optical lens 10 is less than or equal to 1.60.

The camera optical lens 10 has outstanding optical functions, while satisfying a desire of large aperture and long focal length. According to characteristics of the camera optical lens 10, the camera optical lens 10 is especially fit for a mobile phone camera optical lens component and a WEB camera lens composed by such camera elements as CCD and CMOS for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: Total optical length (on-axis distance from the object-side surface of the first lens L1 to the image surface Si) of the camera optical lens 10 in mm.

F number FNO: A ratio of an effective focal length of the camera optical length and an entrance pupil diameter.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R | d |  | nd |  | vd |  |
| --- | --- | --- | --- | --- | --- | --- | --- |
| S1 | ∞ | d0= | −11.331 |  |  |  |  |
| R1 | 32.916 | d1= | 4.000 | nd1 | 1.8017 | v1 | 40.63 |
| R2 | 20.326 | d2= | 7.381 |  |  |  |  |
| R3 | 20.000 | d3= | 4.000 | nd2 | 1.6204 | v2 | 60.37 |
| R4 | −20.000 | d4= | 0.070 |  |  |  |  |
| R5 | 9.966 | d5= | 3.479 | nd3 | 1.6204 | v3 | 60.37 |
| R6 | −63.805 | d6= | 0.000 |  |  |  |  |
| R7 | −63.805 | d7= | 3.286 | nd4 | 1.7552 | v4 | 27.55 |
| R8 | 7.080 | d8= | 1.157 |  |  |  |  |
| R9 | 11.797 | d9= | 2.060 | nd5 | 1.7995 | v5 | 42.25 |
| R10 | 28.359 | d10= | 2.489 |  |  |  |  |
| R11 | −11.067 | d11= | 1.200 | nd6 | 1.5806 | v6 | 60.08 |
| R12 | −61.773 | d12= | 0.500 |  |  |  |  |
| R13 | ∞ | d13= | 0.500 | ndg1 | 1.5233 | vg1 | 54.52 |
| R14 | ∞ | d14= | 0.900 |  |  |  |  |
| R15 | ∞ | d15= | 0.500 | ndg2 | 1.5168 | vg2 | 64.17 |
| R16 | ∞ | d16= | 0.300 |  |  |  |  |

In the table, meanings of various symbols will be described as follows.

S1: aperture;

R: curvature radius at a center an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of an object-side surface of an optical filter GF1;

R14: central curvature radius of an image-side surface of the optical filter GF1;

R15: central curvature radius of an object-side surface of an optical filter GF2;

R16: central curvature radius of the image-side surface of the optical filter GF2;

d: on-axis thickness of a lens and an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF1;

d13: on-axis thickness of the optical filter GF1;

d14: on-axis distance from the image-side surface of the optical filter GF1 to an object-side surface of the optical filter GF2;

d15: on-axis thickness of the optical filter GF2;

d16: on-axis distance from the image-side surface to the image surface S1 of the optical filter GF2;

nd: refractive index of the d line (the d line is a green light having a wavelength of 550 nm);

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

ndg1: refractive index of the d line of the optical filter GF1;

ndg2: refractive index of the d line of the optical filter GF2;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg1: abbe number of the optical filter GF1;

vg2: abbe number of the optical filter GF2.

Table 2 shows aspherical surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | 1.5535E+01 | −1.5916E−04 | −1.1650E−06 | 7.0513E−08 | −3.9764E−09 | 1.2477E−10 |
| R2 | 5.5114E+00 | −1.4318E−04 | −2.5156E−06 | 3.4268E−07 | −2.6001E−08 | 1.1316E−09 |
| R11 | 4.3009E+00 | −2.8584E−03 | 9.2300E−05 | 3.3162E−06 | −1.8944E−06 | 3.1786E−07 |
| R12 | 1.4051E+02 | −3.1288E−03 | 6.3162E−05 | 1.3332E−05 | −3.4145E−06 | 4.2900E−07 |

| | Conic coefficient | Aspheric surface coefficients | | | |
|---|---|---|---|---|---|
| | k | A14 | A16 | A18 | A20 |
| R1 | 1.5535E+01 | −2.3456E−12 | 2.3156E−14 | −9.4202E−17 | 0.0000E+00 |
| R2 | 5.5114E+00 | −2.7220E−11 | 2.7022E−13 | 1.1422E−15 | −3.1389E−17 |
| R11 | 4.3009E+00 | −3.0783E−08 | 1.7802E−09 | −5.6882E−11 | 7.8442E−13 |
| R12 | 1.4051E+02 | −3.2315E−08 | 1.4577E−09 | −3.6217E−11 | 3.8169E−13 |

For convenience, an aspheric surface of each lens surface is an aspheric surface shown in the below formula (1). However, the present disclosure is not limited to the aspherical polynomials form shown in the formula (1).

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Herein, k is a conic coefficient, A4, A6, A8, A10, A12, A14, A16, A18 and A20 are aspheric surface coefficients, c is a curvature at a center of the optical surface, r is a vertical distance from a point on an aspheric surface curve to the optical axis, and z is an aspheric surface depth (a vertical distance between a point on the aspheric surface which is of the distance of r from the optical axis, and a tangent surface that is tangent with a top point of the optical axis of the aspheric surface).

Table 3 shows design data of inflexion points of the camera optical lens 10 according to Embodiment 1 of the present disclosure. Herein, P1R1 represents the object-side surface of the first lens L1. The data in the column named "inflexion point position" refer to vertical distances from inflexion points arranged on each lens surface to the optic axis of the camera optical lens 10.

TABLE 3

| Inflexion point number | Inflexion point position 1 |
|---|---|
| P1R1 | 1 | 5.095 |

Figure 2:
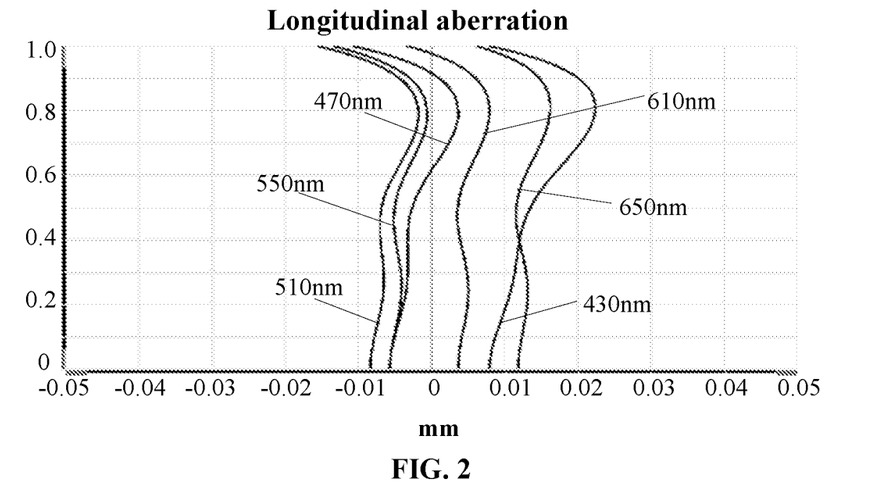
FIG. 2 is a schematic diagram of a longitudinal aberration of the camera optical lens shown in FIG. 1.
Figure 3:
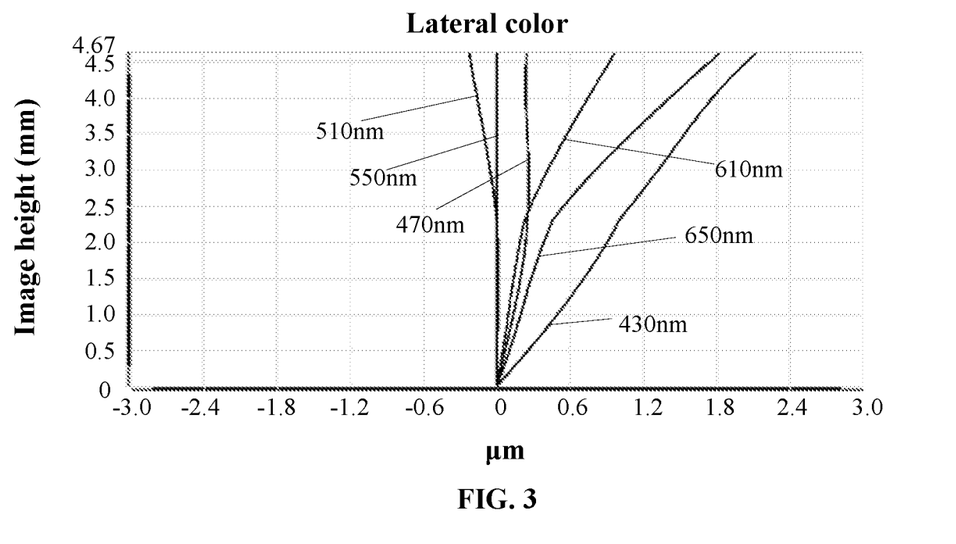
FIG. 3 is a schematic diagram of a lateral color of the camera optical lens shown in FIG. 1.
Figure 4:
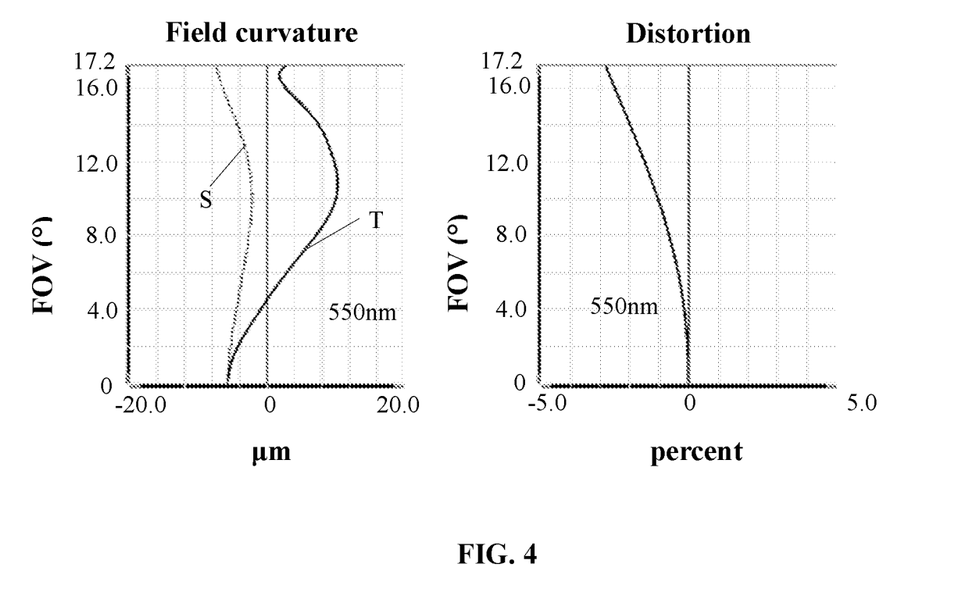
FIG. 4 is a schematic diagram of a field curvature and a distortion of the camera optical lens shown in FIG. 1.

FIG. 2 and FIG. 3 illustrate a longitudinal aberration and a lateral color with wavelengths of 650 nm, 610 nm, 550 nm, 510 nm, 470 nm and 430 nm after passing the camera optical lens 10 according to Embodiment 1, respectively. FIG. 4 illustrates a field curvature and a distortion with a wavelength of 550 nm after passing the camera optical lens 10 according to Embodiment 1. A field curvature S in FIG. 4 is a field curvature in a sagittal direction, and T is a field curvature in a tangential direction.

Table 16 shows values in the embodiments corresponding to the parameters specified in the conditions.

As shown in Table 16, Embodiment 1 satisfies the conditions.

In an embodiment, an entrance pupil diameter ENPD of the camera optical lens 10 is 9.611 mm, an image height IH of 1.0H is 4.626 mm, and an FOV (field of view) in a diagonal direction is 34.38°. Thus, the camera optical lens 10 satisfies a desire of design in large aperture and long focal length. Its on-axis and off-axis aberrations are fully corrected, thereby achieving excellent optical characteristics.

TABLE 4

| | R | d | | nd | | vd |
|---|---|---|---|---|---|---|
| S1 | ∞ | d0= | −9.076 | | | |
| R1 | 17.051 | d1= | 2.465 | nd1 | 1.8017 | v1 | 40.63 |
| R2 | 10.937 | d2= | 6.744 | | | |
| R3 | −200.000 | d3= | 2.465 | nd2 | 1.6204 | v2 | 60.37 |
| R4 | −11.417 | d4= | 0.029 | | | |
| R5 | 11.552 | d5= | 4.000 | nd3 | 1.6204 | v3 | 60.37 |
| R6 | −45.674 | d6= | 0.002 | | | |
| R7 | −45.674 | d7= | 0.841 | nd4 | 1.7552 | v4 | 27.55 |
| R8 | 10.296 | d8= | 0.579 | | | |
| R9 | 15.083 | d9= | 1.990 | nd5 | 1.7995 | v5 | 42.25 |
| R10 | 800.000 | d10= | 7.420 | | | |
| R11 | −7.500 | d11= | 0.992 | nd6 | 1.5806 | v6 | 60.08 |
| R12 | −15.200 | d12= | 0.600 | | | |
| R13 | ∞ | d13= | 0.500 | ndg1 | 1.5233 | vg1 | 54.52 |
| R14 | ∞ | d14= | 0.800 | | | |
| R15 | ∞ | d15= | 0.500 | ndg2 | 1.5168 | vg2 | 64.17 |
| R16 | ∞ | d16= | 0.104 | | | |

Figure 5:
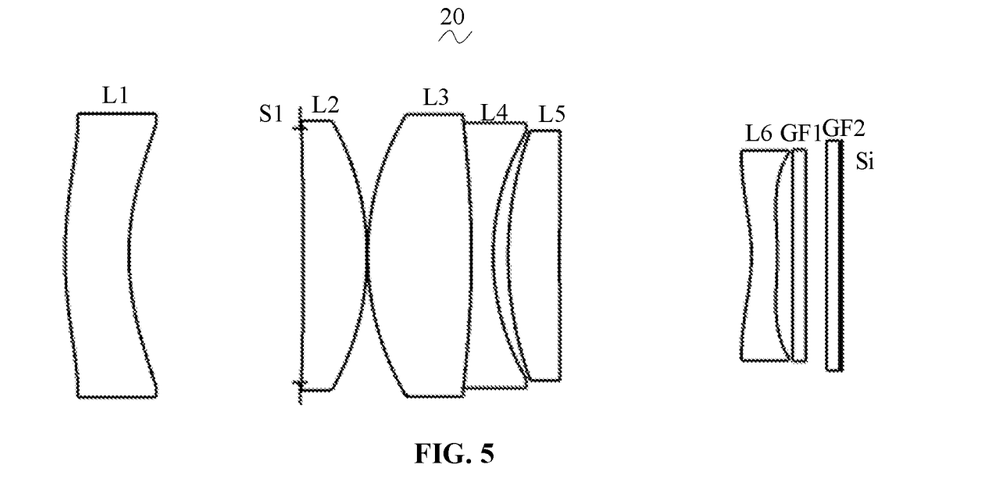
FIG. 5 is a schematic diagram of a structure of a camera optical lens according to Embodiment 2 of the present disclosure.

Table 5 shows aspherical surface data of each lens of the camera optical lens 20 in Embodiment 2 of the present disclosure.

TABLE 5

| | Conic coefficient | Aspheric surface coefficients | | | | |
|---|---|---|---|---|---|---|
| | k | A4 | A6 | A8 | A10 | A12 |
| R1 | −4.0893E+00 | −2.3688E−04 | −4.2406E−06 | 4.6263E−08 | −3.5705E−09 | 1.8138E−10 |
| R2 | 2.2397E+00 | −5.3230E−04 | −5.0214E−06 | −7.7150E−07 | 1.1344E−07 | −1.0571E−08 |
| R11 | −8.7189E+00 | 3.1136E−03 | −2.9717E−04 | 3.5119E−05 | −3.3458E−06 | 2.1717E−07 |
| R12 | −1.9900E+02 | 6.7294E−04 | 7.4657E−04 | −1.7164E−04 | 2.4976E−05 | −2.4096E−06 |

| | Conic coefficient | Aspheric surface coefficients | | | |
|---|---|---|---|---|---|
| | k | A14 | A16 | A18 | A20 |
| R1 | −4.0893E+00 | −4.9541E−12 | 6.2628E−14 | −2.5233E−16 | 0.0000E+00 |
| R2 | 2.2397E+00 | 5.9550E−10 | −2.0308E−11 | 3.8241E−13 | −3.0984E−15 |
| R11 | −8.7189E+00 | −9.2722E−09 | 2.5189E−10 | −3.9478E−12 | 2.6939E−14 |
| R12 | −1.9900E+02 | 1.5259E−07 | −6.0625E−09 | 1.3642E−10 | −1.3144E−12 |

Embodiment 2

Embodiment 2 is basically the same as Embodiment 1 and involves symbols having the same meanings as Embodiment 1, and only differences therebetween will be described in the following.

In an embodiment, the object-side surface of the second lens L2 is concave in the paraxial region.

FIG. 5 is a camera optical lens 20 according to Embodiment 2 of the present disclosure.

Table 4 and Table 5 show design data of a camera optical lens 20 in Embodiment 2 of the present disclosure.

Table 6 and Table 7 show design data of inflexion points and arrest points of lenses in the camera optical lens 10 according to Embodiment 2 of the present disclosure. Herein, P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, and P6R1 and P6R2 respectively represent the object-side surface and the image-side surface of the sixth lens L6. The data in the column named "inflexion point position" refer to vertical distances from inflexion points arranged on each lens surface to the optic axis of the camera optical lens 20. The data in the column named "arrest point position" refer to vertical distances from arrest points arranged on each lens surface to the optical axis of the camera optical lens 20.

TABLE 6

| Inflexion point number | Inflexion point position 1 |
|---|---|
| P1R1 | 1 | 3.425 |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 1.885 |
| P6R2 | 1 | 1.035 |

TABLE 7

| Arrest point number | Arrest point position 1 |
|---|---|
| P1R1 | 1 | 5.555 |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 4.185 |
| P6R2 | 1 | 1.905 |

Figure 6:
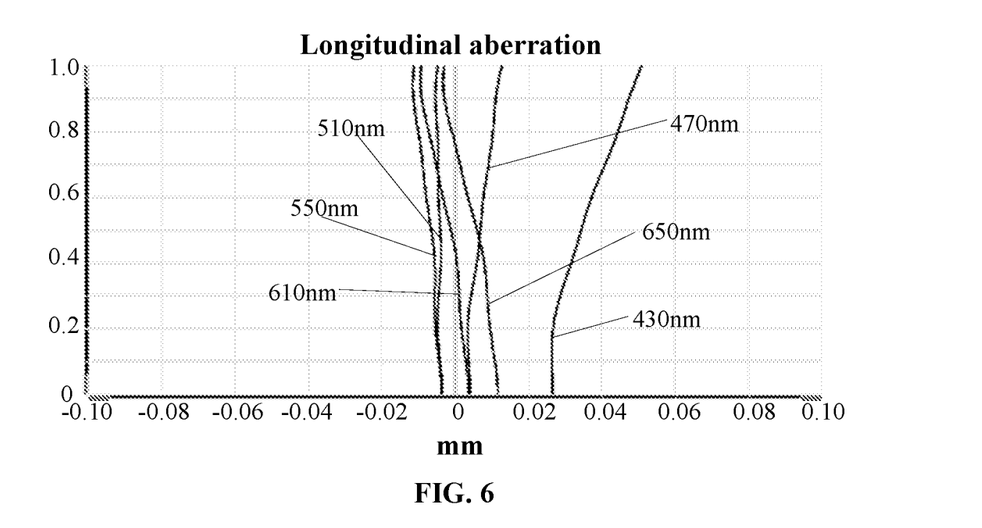
FIG. 6 is a schematic diagram of a longitudinal aberration of the camera optical lens shown in FIG. 5.
Figure 7:
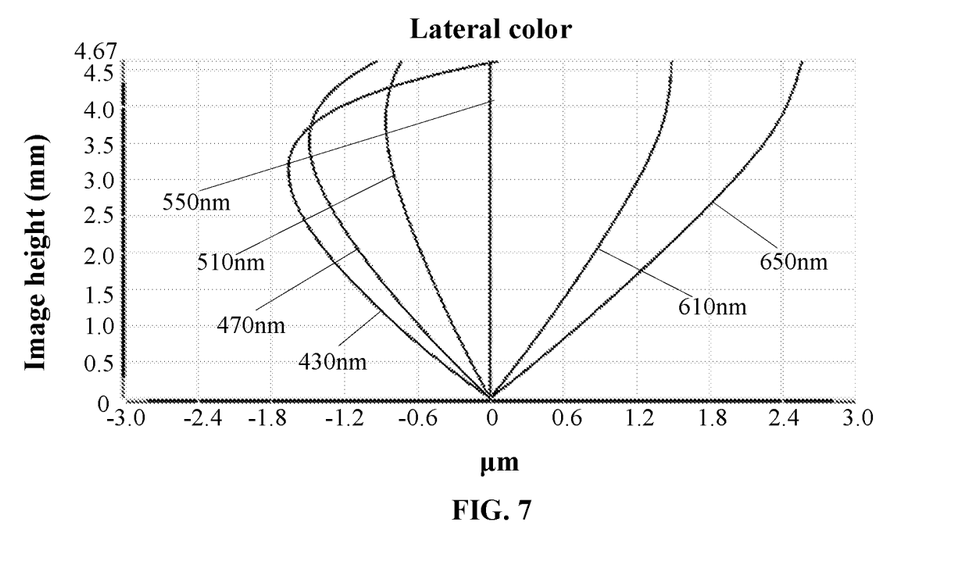
FIG. 7 is a schematic diagram of a lateral color of the camera optical lens shown in FIG. 5.
Figure 8:
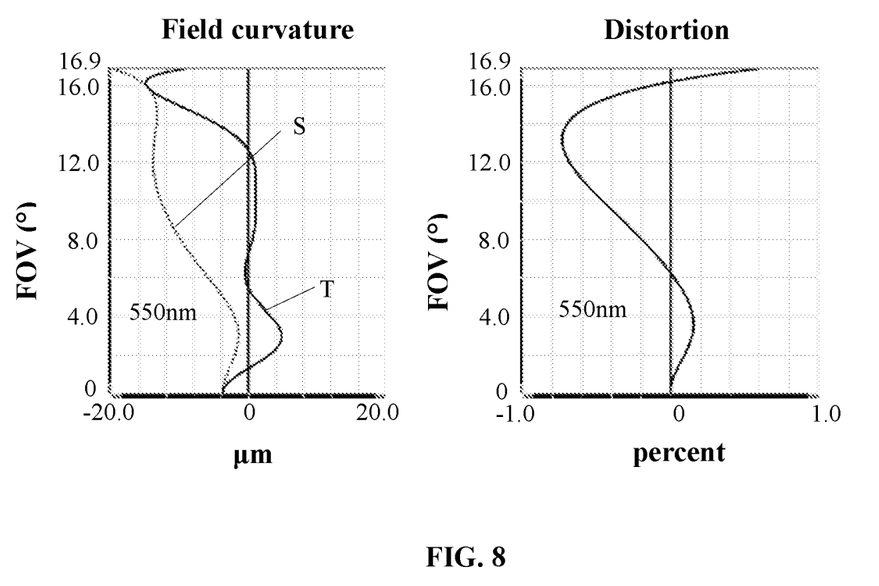
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 550 nm, 510 nm, 470 nm and 430 nm after passing the camera optical lens 20 according to Embodiment 2. FIG. 8 illustrates a field curvature and a distortion of light with a wavelength of 550 nm after passing the camera optical lens 20 according to Embodiment 2. A field curvature S in FIG. 8 is a field curvature in a sagittal direction, and T is a field curvature in a tangential direction.

As shown in Table 16, Embodiment 2 satisfies the conditions.

In an embodiment, an entrance pupil diameter ENPD of the camera optical lens 20 is 9.455 mm, an image height IH of 1.0H is 4.626 mm, and an FOV (field of view) in the diagonal direction is 33.81°. Thus, the camera optical lens 20 satisfies a desire of design in large aperture and long focal length. Its on-axis and off-axis aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Figure 9:
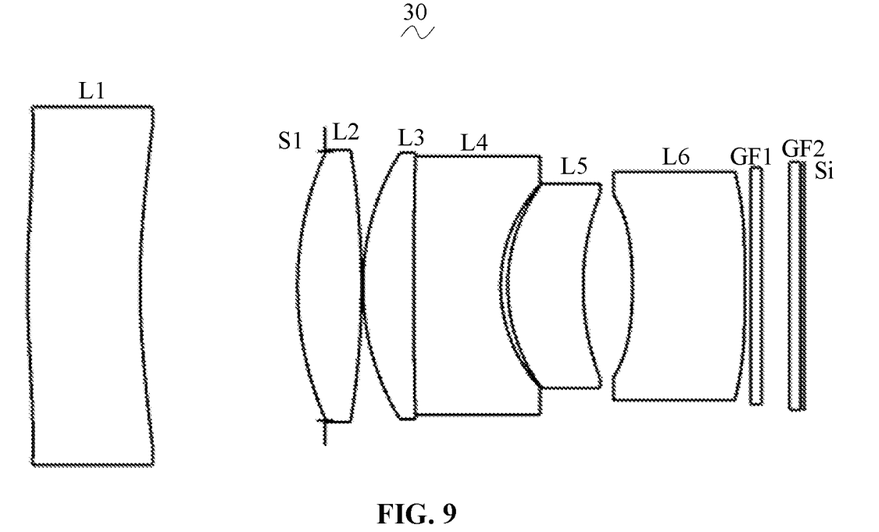
FIG. 9 is a schematic diagram of a structure of a camera optical lens according to Embodiment 3 of the present disclosure.

In an embodiment, the image-side surface of the third lens L3 is concave in the paraxial region and the object-side surface of the fourth lens L4 is convex in the paraxial region.

FIG. 9 is a camera optical lens 30 according to Embodiment 3 of the present disclosure.

Table 8 and Table 9 show design data of the camera optical lens 30 in Embodiment 3 of the present disclosure.

TABLE 8

| | R | d | nd | vd |
|---|---|---|---|---|
| S1 | ∞ | d0= −10.611 | | |
| R1 | 41.985 | d1= 4.000 | nd1 1.8017 | v1 40.63 |
| R2 | 28.089 | d2= 5.621 | | |
| R3 | 12.817 | d3= 2.282 | nd2 1.6204 | v2 60.37 |
| R4 | −32.853 | d4= 0.050 | | |
| R5 | 9.888 | d5= 1.811 | nd3 1.6204 | v3 60.37 |
| R6 | 200.000 | d6= 0.002 | | |
| R7 | 200.000 | d7= 3.103 | nd4 1.7552 | v4 27.55 |
| R8 | 5.776 | d8= 0.251 | | |
| R9 | 6.550 | d9= 2.684 | nd5 1.7995 | v5 42.25 |
| R10 | 9.891 | d10= 1.767 | | |
| R11 | −16.098 | d11= 4.000 | nd6 1.5806 | v6 60.08 |
| R12 | −480.000 | d12= 0.200 | | |
| R13 | ∞ | d13= 0.400 | ndg1 1.5233 | vg1 54.52 |
| R14 | ∞ | d14= 1.000 | | |
| R15 | ∞ | d15= 0.400 | ndg2 1.5168 | vg2 64.17 |
| R16 | ∞ | d16= 0.129 | | |

Table 9 shows aspherical surface data of each lens of the camera optical lens 30 in Embodiment 3 of the present disclosure.

TABLE 9

| | Conic coefficient | Aspherical surface coefficients | | | | |
|---|---|---|---|---|---|---|
| | k | A4 | A6 | A8 | A10 | A12 |
| R1 | 8.2978E+00 | −2.1422E−04 | −2.7935E−07 | 2.1609E−08 | −5.8891E−10 | 1.4327E−11 |
| R2 | 3.5679E+00 | −2.2265E−04 | 1.0342E−06 | 4.0963E−09 | 8.8149E−10 | −4.9414E−11 |
| R11 | 6.0394E+00 | −2.1460E−03 | 3.8383E−05 | −2.1124E−05 | 6.2143E−06 | −1.3309E−06 |
| R12 | 4.2268E+01 | −1.4614E−03 | −6.0096E−05 | 3.2606E−05 | −7.0854E−06 | 9.3256E−07 |

| | Conic coefficient | Aspherical surface coefficients | | | |
|---|---|---|---|---|---|
| | k | A14 | A16 | A18 | A20 |
| R1 | 8.2978E+00 | −1.4697E−13 | 5.8811E−16 | −1.9919E−18 | 0.0000E+00 |
| R2 | 3.5679E+00 | 1.4867E−12 | −2.0991E−14 | 9.7920E−17 | 1.7569E−19 |
| R11 | 6.0394E+00 | 1.8574E−07 | −1.5374E−08 | 6.8542E−10 | −1.2800E−11 |
| R12 | 4.2268E+01 | −7.4808E−08 | 3.5748E−09 | −9.2939E−11 | 1.0034E−12 |

Table 10 and Table 11 show design data of inflexion points and arrest points of lenses in the camera optical lens 30 in Embodiment 3 of the present disclosure.

TABLE 10

| Inflexion point number | Inflexion point position 1 |
|---|---|
| P1R1 | 1 | 3.175 |

TABLE 11

| Arrest point number | Arrest point position 1 |
|---|---|
| P1R1 | 1 | 5.705 |

Figure 10:
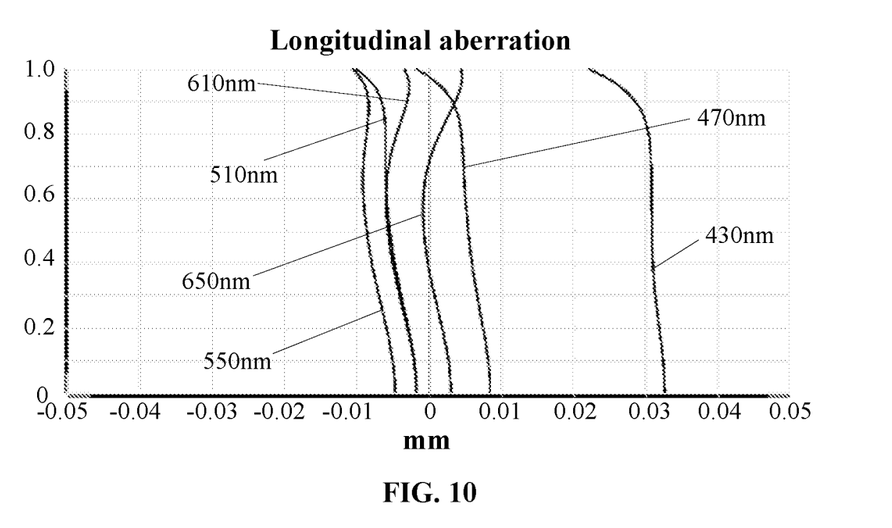
FIG. 10 is a schematic diagram of a longitudinal aberration of the camera optical lens shown in FIG. 9.
Figure 11:
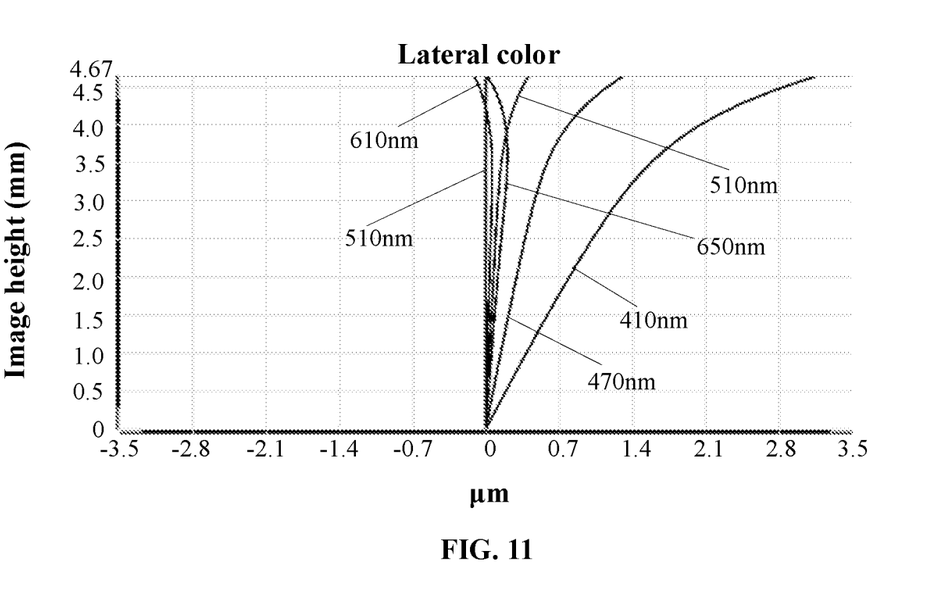
FIG. 11 is a schematic diagram of a lateral color of the camera optical lens shown in FIG. 9.
Figure 12:
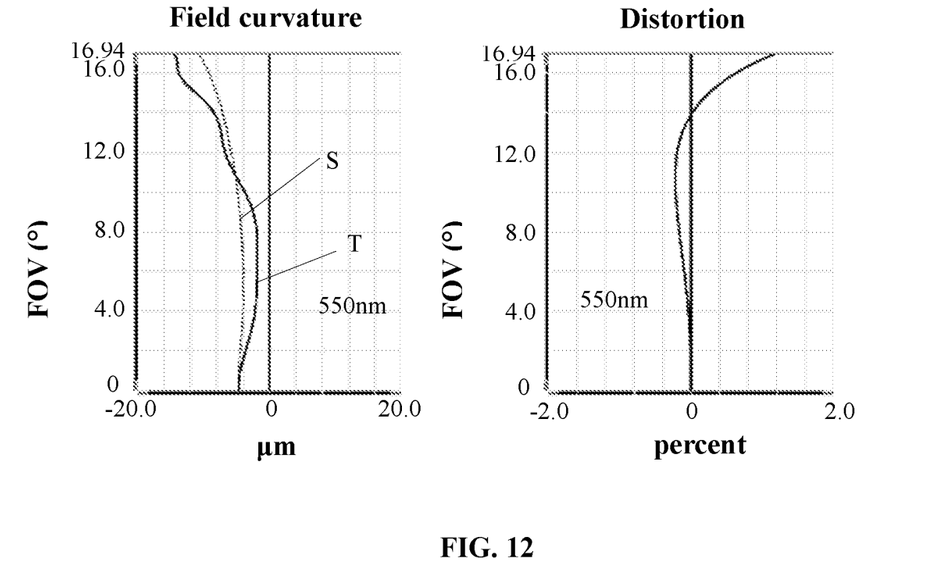
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 550 nm, 510 nm, 470 nm and 430 nm after passing the camera optical lens 30 according to Embodiment 3. FIG. 12 illustrates a field curvature and a distortion of light with a wavelength of 550 nm after passing the camera optical lens 30 according to Embodiment 3. A field curvature S in FIG. 12 is a field curvature in a sagittal direction, and T is a field curvature in a tangential direction.

As shown in Table 16, Embodiment 3 satisfies the conditions.

In an embodiment, an entrance pupil diameter ENPD of the camera optical lens 30 is 9.378 mm, an image height IH of 1.0H is 4.626 mm, and an FOV (field of view) in the diagonal direction is 33.88°. Thus, the camera optical lens 30 satisfies a desire of design in large aperture and long focal length. Its on-axis and off-axis aberrations are fully corrected, thereby achieving excellent optical characteristics.

Contrasting Embodiment

The contrasting embodiment involves symbols having the same meanings as Embodiment 1, and only differences therebetween will be described in the following.

Figure 13:
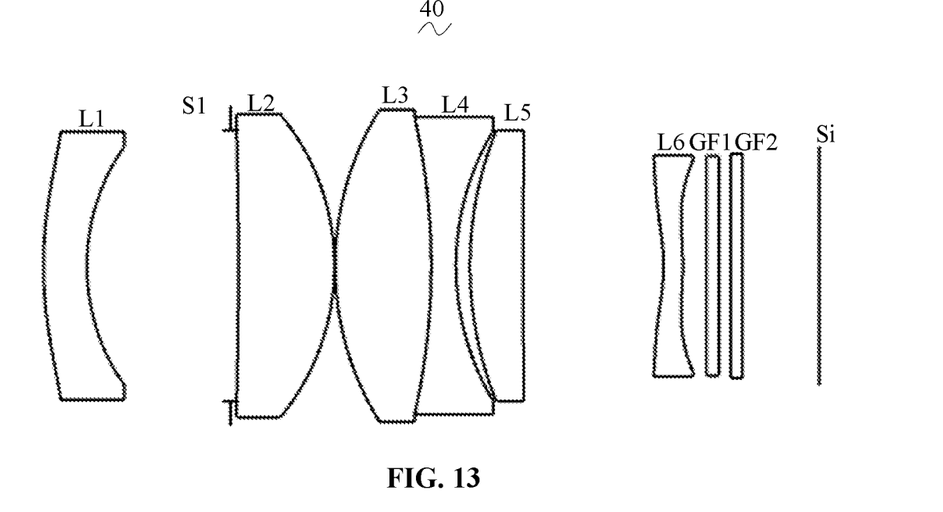
FIG. 13 is a schematic diagram of a structure of a camera optical lens according to a contrasting embodiment of the present disclosure.

In the contrasting embodiment, the object-side surface of the second lens L2 is concave in the paraxial region.

FIG. 13 is a camera optical lens 40 according to the contrasting embodiment.

Table 12 and Table 13 show design data of the camera optical lens 40 in the contrasting embodiment of the present disclosure.

TABLE 12

| | R | d | nd | | vd | |
|---|---|---|---|---|---|---|
| S1 | ∞ | d0= | −7.808 | | | |
| R1 | 16.732 | d1= | 1.808 | nd1 | 1.8017 | v1 | 40.63 |
| R2 | 8.802 | d2= | 6.319 | | | |
| R3 | −200.000 | d3= | 4.000 | nd2 | 1.6204 | v2 | 60.37 |
| R4 | −9.959 | d4= | 0.029 | | | |
| R5 | 12.361 | d5= | 4.000 | nd3 | 1.6204 | v3 | 60.37 |
| R6 | −28.100 | d6= | 0.002 | | | |
| R7 | −28.100 | d7= | 1.035 | nd4 | 1.7552 | v4 | 27.55 |
| R8 | 11.037 | d8= | 0.579 | | | |
| R9 | 15.083 | d9= | 2.226 | nd5 | 1.7995 | v5 | 42.25 |
| R10 | 800.000 | d10= | 5.842 | | | |
| R11 | −7.500 | d11= | 0.800 | nd6 | 1.5806 | v6 | 60.08 |
| R12 | −15.200 | d12= | 1.000 | | | |
| R13 | ∞ | d13= | 0.500 | ndg1 | 1.5233 | vg1 | 54.52 |
| R14 | ∞ | d14= | 0.500 | | | |
| R15 | ∞ | d15= | 0.500 | ndg2 | 1.5168 | vg2 | 64.17 |
| R16 | ∞ | d16= | 3.200 | | | |

Table 13 shows aspherical surface data of each lens of the camera optical lens 40 in the contrasting embodiment of the present disclosure.

TABLE 13

| | Conic coefficient | Aspherical surface coefficients | | | | |
|---|---|---|---|---|---|---|
| | k | A4 | A6 | A8 | A10 | A12 |
| R1 | −1.1110E+00 | 3.9801E−05 | −4.6924E−05 | 5.9431E−06 | −4.5826E−07 | 2.1023E−08 |
| R2 | 1.7951E+00 | −3.2315E−04 | 4.9331E−05 | −2.3750E−05 | 4.5967E−06 | −5.0858E−07 |
| R11 | −7.4254E+00 | 3.8342E−03 | −3.4029E−04 | 4.0528E−05 | −4.3057E−06 | 2.9317E−07 |
| R12 | −8.8936E+01 | 9.4990E−04 | 8.7441E−04 | −2.0368E−04 | 2.7235E−05 | −2.3113E−06 |

| | Conic coefficient | Aspherical surface coefficients | | | |
|---|---|---|---|---|---|
| | k | A14 | A16 | A18 | A20 |
| R1 | −1.1110E+00 | −5.6794E−10 | 8.3074E−12 | −5.0539E−14 | 0.0000E+00 |
| R2 | 1.7951E+00 | 3.3591E−08 | −1.3189E−09 | 2.8443E−11 | −2.6070E−13 |
| R11 | −7.4254E+00 | −1.1997E−08 | 2.8268E−10 | −3.5164E−12 | 1.7862E−14 |
| R12 | −8.8936E+01 | 1.2340E−07 | −3.9695E−09 | 6.9562E−11 | −5.0667E−13 |

Table 14 and Table 15 show design data of inflexion points and arrest points of lenses in the camera optical lens 40 in the contrasting embodiment of the present disclosure.

TABLE 14

| | Inflexion point number | Inflexion point position 1 | Inflexion point position 2 |
|---|---|---|---|
| P1R1 | 1 | 4.275 | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 2 | 1.755 | 3.985 |
| P6R2 | 2 | 1.115 | 4.265 |

TABLE 15

| Arrest point number | Arrest point position 1 |
|---|---|
| P6R2 | 1 | 1.985 |

Figure 14:
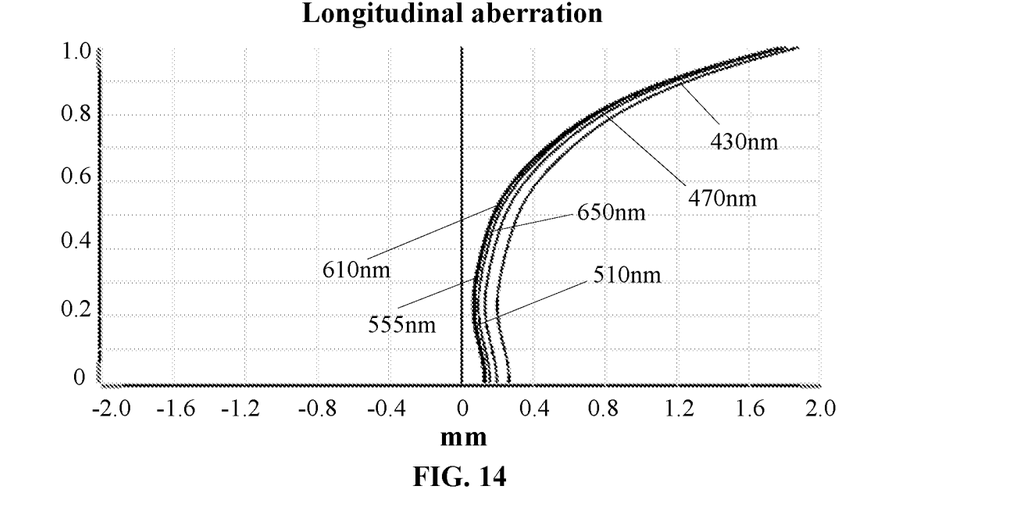
FIG. 14 is a schematic diagram of a longitudinal aberration of the camera optical lens shown in FIG. 13.
Figure 15:
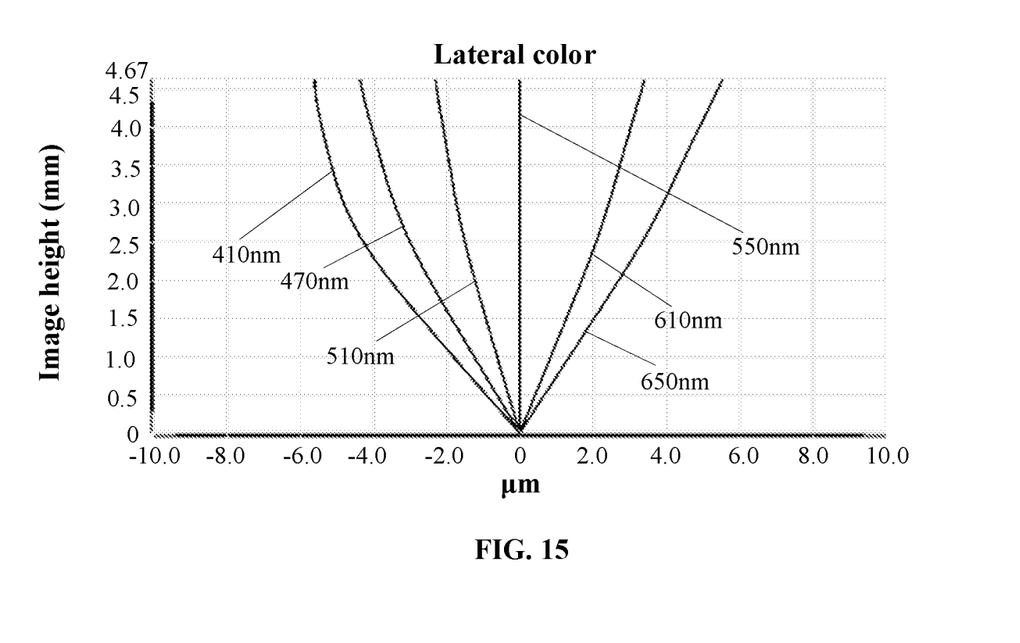
FIG. 15 is a schematic diagram of a lateral color of the camera optical lens shown in FIG. 13.
Figure 16:
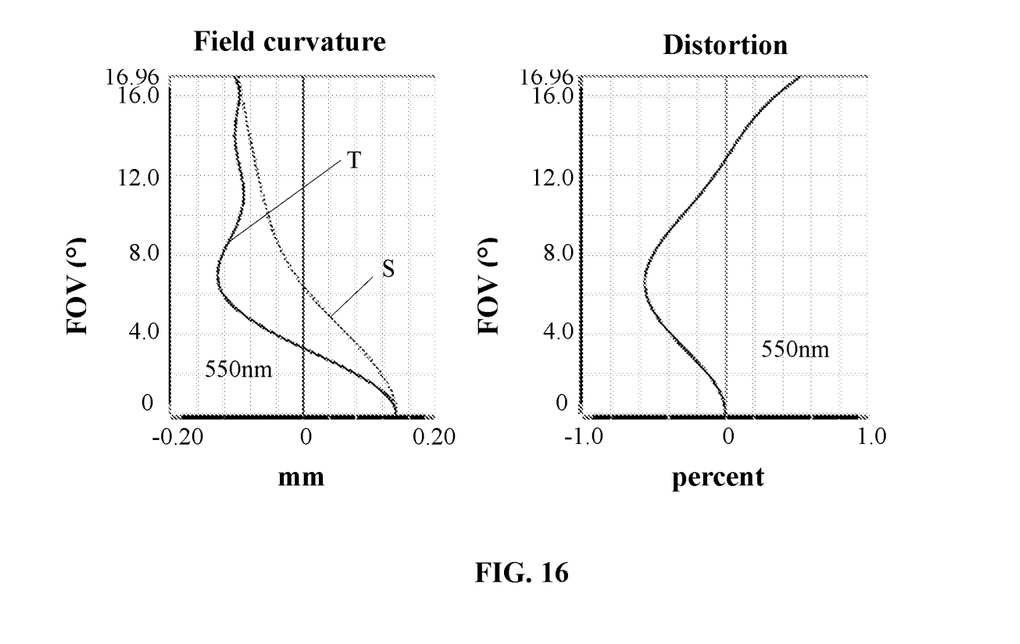
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 550 nm, 510 nm, 470 nm and 430 nm after passing the camera optical lens 40 according to the contrasting embodiment. FIG. 16 illustrates a field curvature and a distortion of light with a wavelength of 550 nm after passing the camera optical lens 40 according to the contrasting embodiment. A field curvature S in FIG. 16 is a field curvature in a sagittal direction, and T is a field curvature in a tangential direction.

Table 16 in the following lists values corresponding to the respective conditions in the contrasting embodiment according to the above conditions. Obviously, the camera optical lens 40 in the contrasting embodiment does not satisfy the above condition of $-8.00 \leq f1/f \leq -3.00$ and can not effectively balance the field curvature of the camera optical lens 40.

In the contrasting embodiment, an entrance pupil diameter ENPD of the camera optical lens 40 is 9.514 mm, an image height IH of 1.0H is 4.626 mm, and an FOV (field of view) in the diagonal direction is 33.93°. Thus, the camera optical lens 40 does not satisfy a desire of design in large aperture and long focal length.

TABLE 16

| Parameters and conditions | Embodiment 1 | Embodiment 2 | Embodiment 3 | Contrasting Embodiment |
|---|---|---|---|---|
| f1/f | −4.996 | −3.051 | −7.987 | −1.685 |
| f34/f | −3.197 | −5.955 | −1.511 | −5.275 |
| R10/R9 | 2.404 | 53.040 | 1.510 | 53.040 |
| R12/R11 | 5.582 | 2.027 | 29.817 | 2.027 |
| d8/d4 | 16.529 | 19.966 | 5.020 | 19.966 |
| f | 15.378 | 15.128 | 15.004 | 15.223 |
| f1 | −76.834 | −46.154 | −119.838 | −25.657 |
| f2 | 16.702 | 19.351 | 15.098 | 16.698 |
| f3 | 14.099 | 15.217 | 16.647 | 14.332 |
| f4 | −8.210 | −10.970 | −7.870 | −10.296 |
| f5 | 23.818 | 19.110 | 17.773 | 19.108 |
| f6 | −23.342 | −26.675 | −28.678 | −26.421 |
| f34 | −49.170 | −90.093 | −22.674 | −80.307 |
| FNO | 1.600 | 1.600 | 1.600 | 1.600 |
| TTL | 31.822 | 30.031 | 27.700 | 32.340 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
    a first lens having a negative refractive power;
    a second lens having a positive refractive power;
    a third lens having a positive refractive power;
    a fourth lens having a negative refractive power;
    a fifth lens having a positive refractive power; and
    a sixth lens having a negative refractive power;
    wherein the camera optical lens satisfies following conditions:

$-8.00 \leq f1/f \leq -3.00$;

$-6.00 \leq f34/f \leq -1.50$; and $R10/R9 \geq 1.50$;

where
    f denotes a focal length of the camera optical lens;
    f1 denotes a focal length of the first lens;
    f34 denotes a combined focal length of the third lens and the fourth lens;
    R9 denotes a central curvature radius of an object-side surface of the fifth lens; and
    R10 denotes a central curvature radius of an image-side surface of the fifth lens.

2. The camera optical lens according to claim 1 further satisfying following condition:

$2.00 \leq R12/R11 \leq 30.00$;

where
    R11 denotes a central curvature radius of an object-side surface of the sixth lens; and
    R12 denotes a central curvature radius of an image-side surface of the sixth lens.

3. The camera optical lens according to claim 1 further satisfying following condition:

$5.00 \leq d8/d4 \leq 20.00$;

where
    d4 denotes an on-axis distance from an image-side surface of the second lens to an object-side surface of the third lens; and
    d8 denotes an on-axis distance from an image-side surface of the fourth lens to an object-side surface of the fifth lens.

4. The camera optical lens according to claim 1, wherein an object-side surface of the first lens is convex in a paraxial region and an image-side surface of the first lens is concave in the paraxial region; and
    the camera optical lens further satisfies following conditions:

$2.11 \leq (R1+R2)/(R1-R2) \leq 7.56$; and $0.04 \leq d1/TTL \leq 0.22$;

where
    R1 denotes a central curvature radius of an object-side surface of the first lens;
    R2 denotes a central curvature radius of an image-side surface of the first lens;
    d1 denotes an on-axis thickness of the first lens; and
    TTL denotes a total optical length from an object-side surface of the first lens to an image surface of the camera optical lens along an optical axis.

5. The camera optical lens according to claim 1, wherein an image-side surface of the second lens is convex in the paraxial region; and
    the camera optical lens further satisfies following conditions:

$0.50 \leq f2/f \leq 1.92$;

$-0.88 \leq (R3+R4)/(R3-R4) \leq 1.68$; and $0.04 \leq d3/TTL \leq 0.19$;

where
    f2 denotes a focal length of the second lens;
    R3 denotes a central curvature radius of an object-side surface of the second lens;
    R4 denotes a central curvature radius of an image-side surface of the second lens; and
    d3 denotes an on-axis thickness of the second lens; and TTL denotes a total optical length from an object-side surface of the first lens to an image surface of the camera optical lens along an optical axis.

6. The camera optical lens according to claim 1, wherein the object-side surface of the third lens is convex in a paraxial region; and
the camera optical lens further satisfies following conditions:

$$0.46 \leq f3/f \leq 1.66;$$

$$-2.21 \leq (R5+R6)/(R5-R6) \leq -0.40;\text{ and}$$

$$0.03 \leq d5/TTL \leq 0.20;$$

where
f3 denotes a focal length of the third lens;
R5 denotes a central curvature radius of an object-side surface of the third lens;
R6 denotes a central curvature radius of an image-side surface of the third lens;
d5 denotes an on-axis thickness of the third lens; and
TTL denotes a total optical length from an object-side surface of the first lens to an image surface of the camera optical lens along an optical axis.

7. The camera optical lens according to claim 1, wherein an image-side surface of the fourth lens is concave in the paraxial region; and
the camera optical lens further satisfies following conditions:

$$-1.45 \leq f4/f \leq -0.35;$$

$$0.32 \leq (R7+R8)/(R7-R8) \leq 1.59;\text{ and}$$

$$0.01 \leq d7/TTL \leq 0.17;$$

where
f4 denotes a focal length of the fourth lens;
R7 denotes a central curvature radius of an object-side surface of the fourth lens;
R8 denotes a central curvature radius of an image-side surface of the fourth lens; and
d7 denotes an on-axis thickness of the fourth lens; and
TTL denotes a total optical length from an object-side surface of the first lens to an image surface of the camera optical lens along an optical axis.

8. The camera optical lens according to claim 1, wherein an object-side surface of the fifth lens is convex in a paraxial region and an image-side surface of the fifth lens is concave in the paraxial region, and
the camera optical lens further satisfies following conditions:

$$0.59 \leq f5/f \leq 2.32;$$

$$-9.84 \leq (R9+R10)/(R9-R10) \leq -0.69;\text{ and}$$

$$0.03 \leq d9/TTL \leq 0.15;$$

where
f5 denotes a focal length of the fifth lens;
d9 denotes an on-axis thickness of the fifth lens; and
TTL denotes a total optical length from an object-side surface of the first lens to an image surface of the camera optical lens along an optical axis.

9. The camera optical lens according to claim 1, wherein an object-side surface of the sixth lens is concave in a paraxial region, an image-side surface of the sixth lens is convex in the paraxial region, and
the camera optical lens further satisfies following conditions:

$$-3.82 \leq f6/f \leq -1.01;$$

$$-5.90 \leq (R11+R12)/(R11-R12) \leq -0.71;\text{ and}$$

$$0.02 \leq d11/TTL \leq 0.22;$$

where
f6 denotes a focal length of the sixth lens;
R11 denotes a central curvature radius of an object-side surface of the sixth lens;
R12 denotes a central curvature radius of an image-side surface of the sixth lens;
d11 denotes an on-axis thickness of the sixth lens; and
TTL denotes a total optical length from an object-side surface of the first lens to an image surface of the camera optical lens along an optical axis.

10. The camera optical lens according to claim 1, wherein at least one of the first lens, the second lens, the third lens, the fourth lens, the fifth lens and the sixth lens is glass.

* * * * *